United States Patent [19]

Takada

[11] Patent Number: 4,809,925
[45] Date of Patent: Mar. 7, 1989

[54] SEAT BELT RETRACTOR

[76] Inventor: Juichiro Takada, 12-1, 3 Chome, Shinmachi, Setagayaku, Tokyo, Japan

[21] Appl. No.: 99,339

[22] Filed: Sep. 21, 1987

[30] Foreign Application Priority Data

Sep. 26, 1986 [JP] Japan .......................... 61-146473[U]

[51] Int. Cl.⁴ ............................................. B60R 22/44
[52] U.S. Cl. ................................................... 242/107
[58] Field of Search ........................ 242/107, 107.4 R; 280/806, 807

[56] References Cited

U.S. PATENT DOCUMENTS

| | | | |
|---|---|---|---|
| 4,113,200 | 9/1978 | Tanaka ............................. | 242/107 |
| 4,123,013 | 10/1978 | Bottrill et al. ..................... | 242/107 |
| 4,564,153 | 1/1986 | Morinaga et al. ................ | 242/107 |
| 4,585,185 | 4/1986 | Ueda .................................. | 242/107 |

FOREIGN PATENT DOCUMENTS

| | | | |
|---|---|---|---|
| 2478471 | 9/1981 | France ......................... | 242/107.4 R |
| 2123271 | 2/1984 | United Kingdom ......... | 242/107.4 R |

Primary Examiner—John M. Jillions
Attorney, Agent, or Firm—Brumbaugh, Graves, Donohue & Raymond

[57] ABSTRACT

A vehicle seat belt retractor comprises a tension-reduction mechanism in which a second spiral winding spring is connected in parallel with the main spiral winding spring between the retractor frame and the belt reel. A gear clutch is interposed between the second winding spring and the reel. One element of the gear clutch is selectively locked to the reel frame in response to connection of the belt to the buckle, thereby preventing the second spring from acting on the reel. When the belt is disconnected from the buckle, both springs work in parallel to wind the belt onto the reel.

1 Claim, 4 Drawing Sheets

SEAT BELT RETRACTOR

BACKGROUND OF THE INVENTION

The present invention relates to vehicle seat belt retractors of the type that have a tension-reduction mechanism. Belt retractors of this type are known in the art and solve the problem common to retractors without tension-elimination or tension-reduction features of providing either no tension or low tension when the belt is fitted to the vehicle occupant, thus making the belt more comfortable and still imparting sufficient winding force to the belt reel to retract the belt.

Retractors having tension-relief mechanisms are described and shown, for example, in U.S. Pat. No. 4,494,709 and British Pat. No. 2,072,490. The tension-reduction mechanisms of the retractors of those patents employ two winding springs connected in series with each other between the retractor frame and the belt reel. A gear clutch mechanism interposed between the two springs, one disc element of which is arranged to be fixed to the frame when the belt is in use, enables one winding spring to be deactivated while the other winding spring allows the belt to be pulled out when the occupant leans forward and then restores the belt to a memorized, tensionless state.

While the retractors of the aforementioned patents have desirable features and are reliable, they are relatively complicated, which means they are expensive to make, increase the size of the retractor, and are subject to malfunctions of the relatively complicated tension-relief mechanism.

SUMMARY OF THE INVENTION

An object of the present invention is to provide a seat belt retractor having a tension-reduction mechanism that is relatively uncomplicated and, therefore, can be produced inexpensively, is of comparatively small size, and provides a long service life and greater reliability.

The foregoing object is attained, according to the invention, by a seat belt retractor having a frame rotatably supporting a reel shaft, a belt reel affixed on the reel shaft for rotation therewith and a first spiral winding spring connected between the frame and the reel shaft for rotationally biasing the reel in the belt-winding direction. The retractor further includes a mechanism for rotationally biasing the reel selectively in the belt-winding direction and acting in parallel with the first spiral winding spring only when the belt is not connected to a locking belt-buckle. The present invention is characterized in that said mechanism comprises a gear wheel having an internal gear formed on the inner peripheral surface thereof and a sub-shaft engaging the reel shaft for rotation therewith and receiving an inner end of the first spiral winding spring. A hook is pivotably supported in a notch along the perimeter of the gear wheel and is normally biased towards the axis of the gear wheel by a spring. A gear carrier is rotatably carried on the sub-shaft of the gear wheel for selective relative rotation therewith and has external gear teeth formed around the outer periphery thereof. An idler gear is rotatably supported by the gear carrier and has a projection adapted to engage selectively a projection on the hook and thereby pivot the hook against its bias and engage a tip of the hook with an abutment on the gear carrier and connect the gear carrier and gear wheel. A second spiral winding spring is connected between the gear carrier and the frame and biases the gear carrier in the belt-winding direction in parallel with the first spiral winding spring when the gear carrier and gear wheel are connected by engagement of the hook with the abutment. There is a device for detecting the connection of the belt with the buckle, and a lever pivotally mounted on the frame and having a rocking pawl at the tip thereof engageable with the external gear teeth of the gear carrier to prevent rotation of the gear carrier in the belt-winding direction is pivoted in response to the detecting device to engage the rocking pawl with the external teeth of the gear carrier when the belt and buckle are connected. Such engagement prevents the gear carrier from rotating in the belt-winding direction, and the force of the second spring is not applied to the belt.

For a better understanding of the invention, reference may be made to the following description of an exemplary embodiment, taken in injunction with the accompanying drawings.

DESCRIPTION OF THE EMBODIMENT

Figure 1:
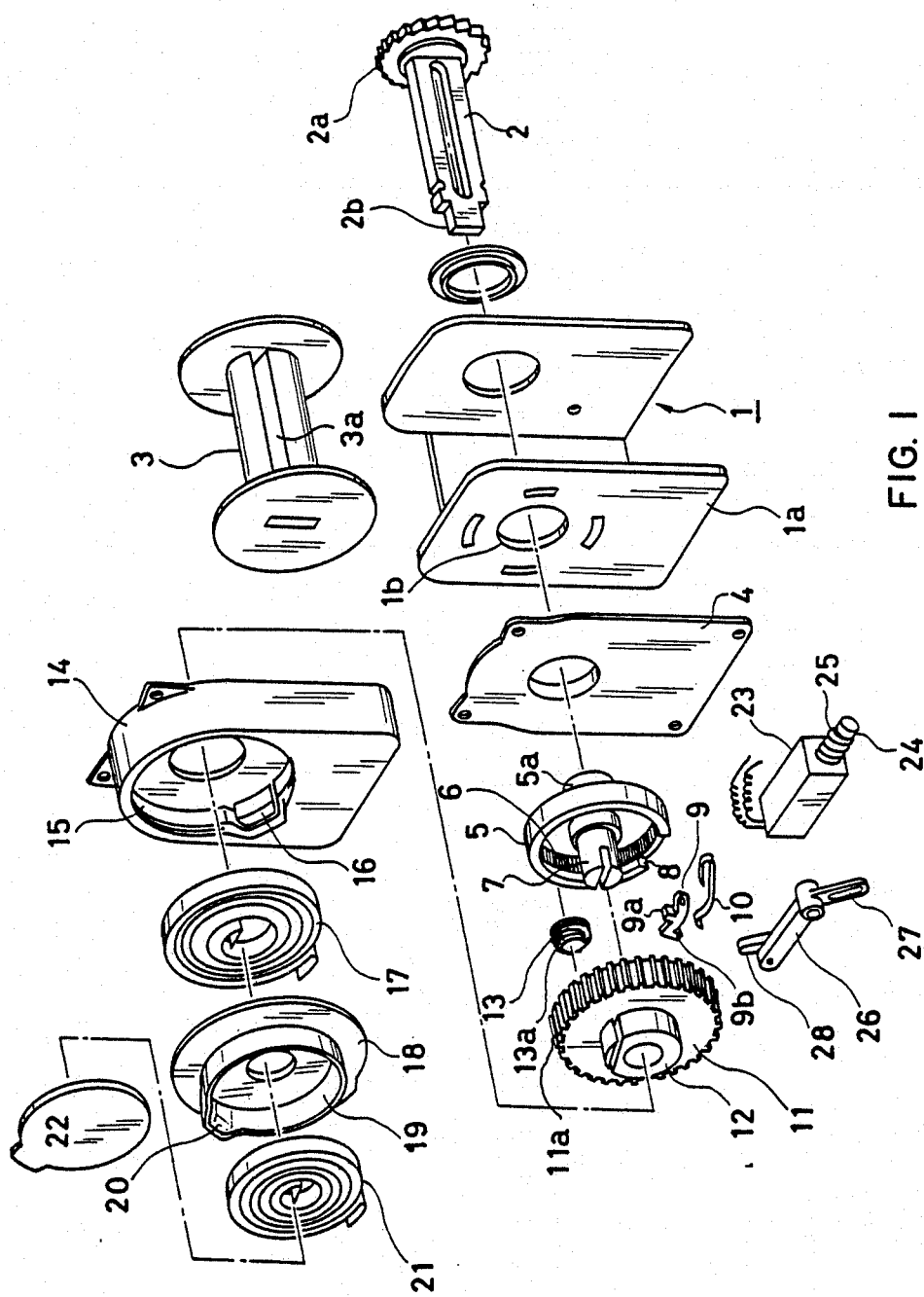
FIG. 1 is an overall exploded pictorial view of the embodiment.
Figure 3:
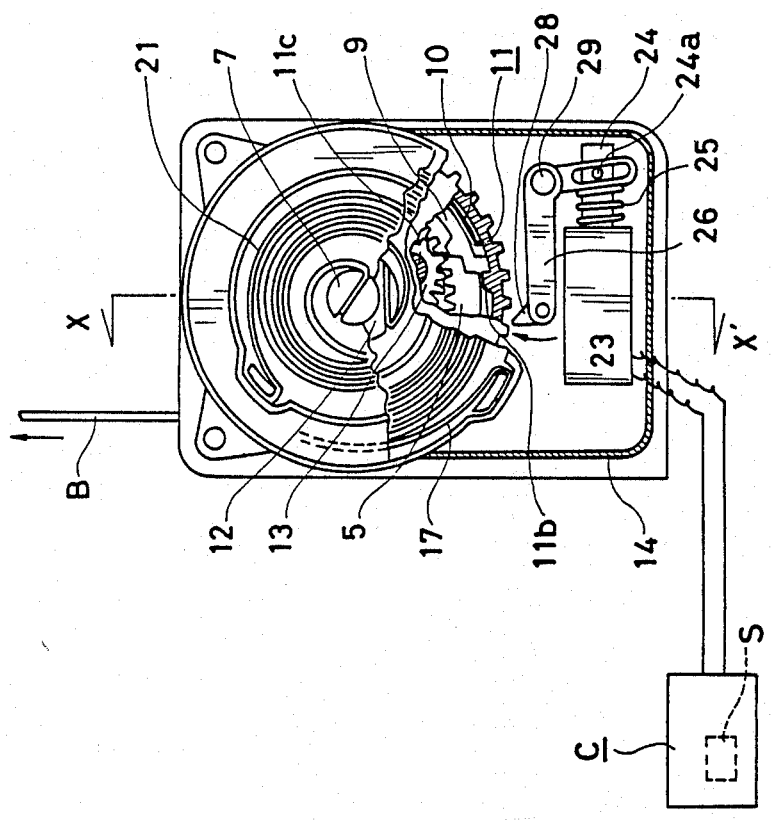
FIG. 3 is a partly broken away side elevational view of the embodiment.
Figure 2:
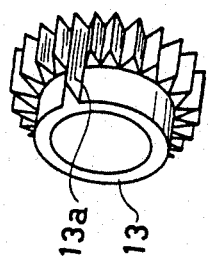
FIG. 2 is an enlarged perspective view of an idler gear used in the embodiment.
Figure 4:
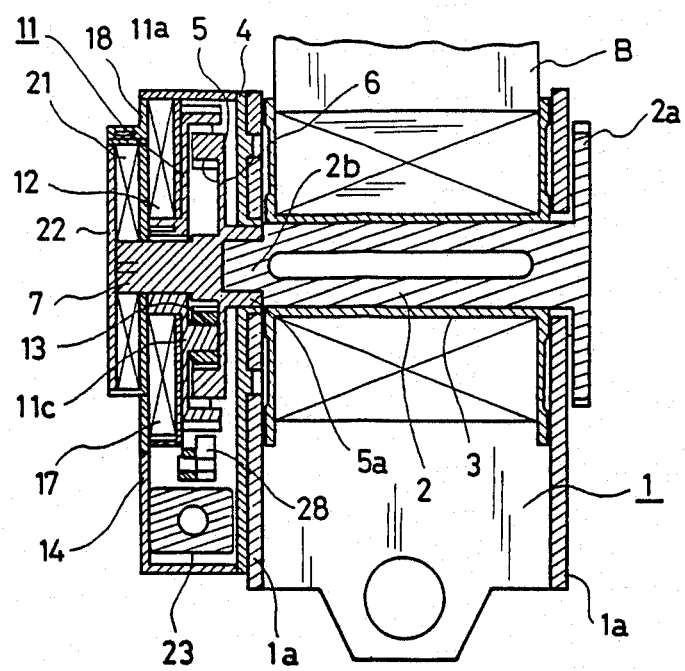
FIG. 4 is a sectional view taken along lines X—X of FIG. 3.

With reference first to FIGS. 1 and 3, a U-shaped frame 1 of the belt retractor has a hole 1b in one of a pair of side walls 1a. A main shaft 2 extends through the hole 1b and through a similar hole in the other side wall. A ratchet wheel 2a of an emergency locking device of a suitable construction (not shown), many of which are well-known per se in the art, is secured to one end of the main shaft 2, and the other end of the shaft is formed with a square shaft extension 2b.

A belt reel, which has a groove 3a for affixation of the inner end of the seat belt B to its axial portion, is received on the main shaft 2 so as to rotate with it between the side walls of the frame 1. A bearing plate 4 is fixed to the side wall 1a of the frame 1 by suitable means, such as screws, and rotatably supports a boss 5a of a gear wheel 5. A square hole in the boss 5a mates with the square end 2b of the main shaft 2 such that the gear wheel rotates with the shaft.

The gear wheel 5 has a peripheral flange having on its inner surface an internal gear 6 that meshes with an idler gear 13. The gear wheel 5 has a sub-shaft 7 to which the inner end of a main spring 21 is attached, and the peripheral flange is formed with a notch 8 that receives a hook 9. The hook 9 is pivotally supported at one end inside the notch 8 and has a projection 9a that is engageable by a projection 13a on the idler gear 13. The tip portion 9b of the hook 9 is engageable with a projection 11b of a gear carrier 11. Normally, the hook is biassed to pivot in a direction towards the center of the gear wheel 5 (clockwise) by a spring 10 that is secured to the gear wheel 5.

The gear carrier 11 fits rotatably on the subshaft 7 of the gear wheel 5 and has an external gear 11a on its outer periphery that is engageable by a rocking pawl 28 carried by a lever 26. The gear carrier 11 also has a projection 11b (see FIG. 3) extending in from the flange, which flange also defines a circular recess that faces the frame 1. The projection 11b is engageable by the tip portion 9b of the hook 9 when the hook is pushed out by the projection 13a on the idler gear. A shaft 11c projects into the round recess and carries the idler gear 13. Formed at the center and on the opposite surface (the surface away from the frame) of the gear carrier 11 is a boss 12, to which the inner end of an auxiliary spring 17 is attached.

The idler gear 13, it will be recalled, is pivotally supported by the shaft 11c of the gear carrier 11, meshes with the internal gear 6 of the gear wheel 5 and has a projection 13a for engaging the projection 9a on the hook 9. Due to the clutch action resulting from the rotation of the gear carrier 11, the idler gear 13 provides for coupling the gear wheel. 5 to the gear carrier 11 at a particular point of rotation of the gear wheel relative to the gear carrier. The relationship or timing between both projections 9a and 13a is set in advance such that when the projection 13a on the idler gear engages the projection 9a on the hook, the hook 9 is pivoted counter-clockwise to engage the tip portion 9b of the hook 9 with the projection 11b of the gear carrier 11, which prevents relative rotation between the gear wheel 5 and the gear carrier 11.

Reference numeral 14 designates a cover, which is fitted to the frame side wall 1a together with the bearing plate 4. It has a compartment 15 at its outward side for the auxiliary spring 17. A housing 18 fits over the auxiliary spring 7 and has a compartment 19 for the main spring 21. On the inside of the cover 14 there is a compartment for an electrommagnetic solenoid 23 and a shaft 29 for pivotably supporting the lever 26. A cap 22 is fitted and fixed to the storage chamber 19 of the housing 18 and also functions as a retainer for the main spring 21.

The outer end of the auxiliary spring 17 is held by a retainer portion 16 on the inner peripheral surface of the compartment 15, while the inner end is held by the boss portion 12 such that the auxiliary spring 17 urges the gear carrier 11 in the belt-winding direction of rotation of the reel 3.

The outer end of the main spring 21 is held by a retainer portion 20 on the wall of the compartment 19 while its inner end is held by the sub-shaft 7, such that the main spring 21 also urges gear wheel 5 and the belt reel 3 in the belt-winding direction of rotation.

The block C of FIG. 3 schematically represents a coupling detection circuit for detecting a properly connected state between a buckle tongue on the belt B and a buckle (both not shown in the drawings). This circuit is constructed in a manner known per se so that when the tongue and the buckle are connected an electric detection signal is generated. For example, the circuit C is constructed in such a fashion that the tongue, which is inserted and coupled to the buckle member, engages and closes a switch S in the buckle to energize the circuit C.

The electromagnetic solenoid 23 includes a plunger 24 and a spring 25 that pushes the plunger 24 to an extended position. When the coupling detection circuit C generates the detection signal, it operates to place the solenoid 23 in the energized state.

The lever 26 is rotatably supported at an intermediate pivot point by the shaft 29 on the cover 14 and has at its tip end a rocking pawl 28 capable of rotating only counter-clockwise (relative to FIG. 3) and at the other end a slot 27. The lever 26 is connected to the solenoid plunger 24 by a pin 24a.

The relationship of operation between the rocking pawl 28 on the lever 26, the electromagnetic solenoid 23, and the gear 11a of the gear carrier 11 is as follows:

1. When the electromagnetic solenoid 23 is deenergized, the spring 25 keeps the pivot lever 26 at rest at a position where the rocking pawl 28 and the gear 11a of the gear carrier 11 do not engage.

2. When the electromagnetic solenoid 23 is energized, the lever 26 is rotated to the position where the rocking pawl 28 meshes with a tooth of the gear 11a.

The operation of the embodiment based on the aforedescribed construction will now be described in the following sections.

(a) Belt Storace State

Figure 5A:
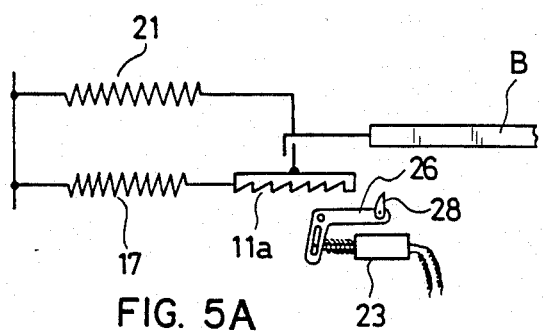
FIG. 5(a)–(c) are schematic representations of the states of the embodiment at various operative stages.

In this state, the buckle tongue of the belt B and the buckle are not connected, so the electromagnetic solenoid 23 is kept deenergized. Therefore, the plunger 24 is biased to its extended position by the force of the spring 25, causing the lever 26 to rest at the position where the rocking pawl 28 does not engage the gear 11a of the gear carrier 11. Therefore, the gear carrier 11 can rotate freely, and the three elements, that is, the sub-shaft 7, the main shaft 2 and the belt reel 3 are in a state where the belt can be wound by the combined urging force of the main spring 21 and the auxiliary spring 17 [see FIG. 3 and FIG. 5(a)].

In particular, however, the projection 13a of the idler gear 13 meshes with the projection 9a of the hook 9 and pivots the hook outwardly. Therefore, even though the belt B can be wound on to the reel in this state, the tip portion 9b of the hook engages the projection 11b of the gear carrier 11 and prevents the rotation of the gear carrier 11 in the winding direction (counterclockwise) relative to the gear wheel 5.

Accordingly, the device operates in this state such that the belt B is fully taken up on the reel 3.

(b) Pulling the Belt Out and Fitting It to The Occupant

When the occupant pulls out the belt B for use, the main shaft 2 rotates in the bell pull-out direction so that the gear wheel 5 and the gear carrier 11, which are connected to each other by the hook 9, also rotate in the pull-out direction (clockwise in FIG. 3) and wind up both main spring 21 and auxiliary spring 17.

When the occupant connects the buckle tongue on the belt B and the buckle, the switch S in the buckle is closed and the electromagnetic solenoid 23 is energized. Therefore, the plunger 24 is attracted inwardy and the lever 26 pivots in the direction represented by the arrow in FIG. 3. As a result, the rocking pawl 28 meshes with the gear 11a of the gear carrier 11, and the rotation of the gear carrier 11 in the belt-winding direction is prevented.

Figure 5B:
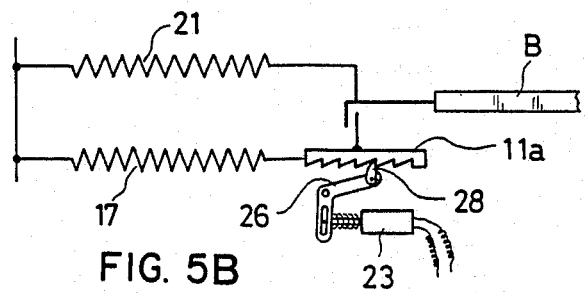

Consequently, the urging force of the auxiliary spring 17 in the winding direction is not transmitted. to the gear wheel 5 and, therefore, the main shaft 2, and only the urging force of the main spring 21 is applied to the belt B [see FIG. 5(b)].

(c) Post-Fitting Operation

When the occupant lets go of the belt B, which is usually pulled out excessively for coupling the tongue and the buckle, the slack in the belt B is wound back only by the urging force of the main spring 21 until it fits suitably to the body of the passenger.

In other words, in the aforedescribed state of FIG. 5(b), the idler gear 13 meshing with the internal gear 6 of the gear wheel 5 can rotate on its own axis around the shaft 11c. Accordingly, when the gear wheel 5 rotates together with the reel 2 at the time of rewinding of the excessively pulled-out belt B, the idler gear 13 rotates on its own axis and disengages its projection 13a from the projection 9a of the hook 9.

Figure 5C:
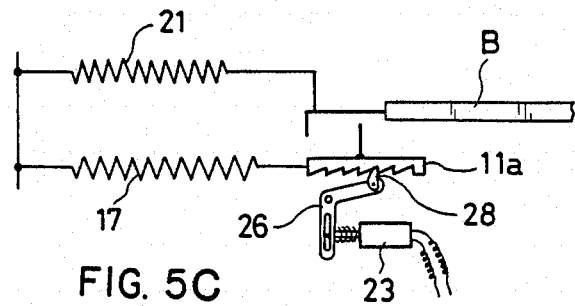

Therefore, the hook 9 returns into the notch 8 due to the urging force of the spring 10 and disengages from the projection 11b of the gear carrier 11 so that the relationship between the gear wheel 5 and the gear carrier 11 shifts to the state where they can rotate independently of each other. As a result, the gear wheel 5 rotates freely with the main shaft 2 and the like and rewinds the belt until it fits suitably to the body of the passenger [see FIG. 5(c)].

In this state, only the urging force of the main spring 21 is applied to the body of the passenger and the pressure exerted thereby on the passenger is reduced to a comfortable level.

(d) Operation When the Passenger Leans Forward After Fitting of the Belt

When the passenger leans forward from his normal sitting posture, the belt is, accordingly, pulled out. At this time, the main shaft 2 and the gear wheel 5 rotate to wind only the main spring 21 until he excessive quantity of the belt, which has been rewound at the time of fitting of the belt as described above, is pulled out. The idler gear 13 meshed with the internal gear 6 of the gear wheel 5 continues rotating on its own axis around the shaft 11c.

When a length of belt equal to the original slack when the buckle was connected has been unwound, the projection 13a of the idler gear 13 meshes with the projection 9a of the hook 9, biasing upward the hook 9 against the urging force of the spring 10. The tip portion 9b of the hook 9 then engages the projection 11b of the gear carrier 11 and engages the gear carrier 11 with the gear wheel 5. As a result, if the belt B is pulled out beyond the amount of the original slack, the gear wheel 5 and the gear carrier 11 rotate with each other, and the belt B is thereafter pulled out while winding both the main spring 21 and the auxiliary spring 17.

The rocking pawl 28 of the pivot lever 26 and the gear 11a of the gear carrier 11 mesh with each other at this point, but since the rocking pawl 28 itself is rotatably supported only in the counter-clockwise direction (upward in FIG. 3) on the pivot lever 26, the rotation of the gear carrier 11 in the clockwise direction (the belt pull-out direction) is not prevented.

(e) Operation When the Passenger Returns to a Normal Sitting Posture After Leaning Forward When the passenger returns to a normal sitting posture after leaning forward, the belt B is wound only by the urging force of the main spring 21 in the same manner as described in (c) above. The rotation of the gear carrier 11 in the counter-clockwise direction (the winding direction) is prevented by the rocking pawl 28, and the winding force of the auxiliary spring 17 is not transmitted to the belt reel 3.

(f) Operation When the Tongue and Buckle are Disconnected

When the tongue is released from the buckle, the switch S in the buckle is opened, and the electromagnetic solenoid 23 is deenergized. Therefore, the plunger 24 is pushed out by the spring 25 and pivots the lever 26 to thereby disengage the rocking pawl 28 from the gear 11a of the gear carrier 11. As a result, the gear carrier 11 can rotate counterclockwise (in the winding direction) due to the urging force of the auxiliary spring 17.

On the other hand, the idler gear 13 meshing with the internal gear 6 rotates on its own axis with the rotation of the gear wheel 5 until its projection 13a meshes with the projection 9a on the side of the hook 9 to complete connection between the gear wheel 5 and the gear carrier 11. Therefore, the gear wheel 5 and the carrier 11 rotate together by the combined urging force of the main spring 21 and the auxiliary spring 17 and completely take up the belt B on the reel 3. The idler gear 13 stops its rotation after both members 5 and 11 are connected to each other.

The detailed description of the preferred embodiment of the invention having been set forth herein for the purpose of explaining the principles thereof, it is known to the art that there may be modifications, and variations of the invention without departing from the scope of the invention and the claims thereto.

I claim:

1. A seat belt retractor having a frame rotatably supporting a reel shaft, a belt reel affixed on the reel shaft for rotation therewith and a first spiral winding spring connected between the frame and the reel shaft for rotationally biasing the reel in the belt-winding direction, characterized in that there is a mechanism for rotationally biasing the reel selectively in the belt-winding direction and acting in parallel with the first spiral winding spring only when the belt is not connected to a locking belt-buckle, said mechanism comprising
    a gear wheel having an internal gear formed on the inner peripheral surface thereof, a subshaft engaging the reel shaft for rotation therewith and receiving an inner end of the first spiral winding spring,
    a hook pivotably supported in a notch along the perimeter of the gear wheel and normally biased towards the axis of the gear wheel by a spring,
    a gear carrier rotatably carried on the sub-shaft of the gear wheel for selective relative rotation therewith and having external gear teeth formed around the outer periphery thereof,
    an idler gear rotatably supported by the gear carrier and having a projection adapted to engage selectively a projection on the hook and thereby pivot the hook against its bias and engage a tip of the hook with an abutment on the gear carrier and connect the gear carrier and gear wheel,
    a second spiral winding spring connected between the gear carrier and the frame and biasing the gear carrier in the belt-winding direction in parallel with the first spiral winding spring when the gear carrier and gear wheel are connected by engagement of the hook with the abutment,
    means for detecting the connection of the belt with the buckle,
    a lever pivotally mounted on the frame and having a rocking pawl at the tip thereof engageable with the external gear teeth of the gear carrier to prevent rotation of the gear carrier in the belt-winding direction, and actuating means responsive to the detecting means for selectively pivoting the lever to engage the rocking pawl with the external teeth of the gear carrier when the belt and buckle are connected.

* * * * *